Aug. 12, 1952     B. A. DERR     2,606,584

HANDSAW

Filed May 15, 1950

INVENTOR
Bernard A. Derr
BY W. S. McDowell
ATTORNEY

Patented Aug. 12, 1952

2,606,584

UNITED STATES PATENT OFFICE 2,606,584

HANDSAW

Bernard A. Derr, Columbus, Ohio, assignor to Larsan Manufacturing Company, Columbus, Ohio, a corporation of Ohio Application May 15, 1950, Serial No. 162,033

1 Claim. (Cl. 145—31)

This invention relates to hand saws and has particular reference to an improved blade for such saws wherein the blade possesses a slotted end of novel configuration adapting the blade for improved attachment with an associated handle.

An object of the present invention is to provide a saw blade with end slots so arranged as to resist effectively separation of the blade from an associated handle or actuating grip.

It is another object of the invention to provide a saw blade having formed in one end thereof a slot which is disposed so that the longitudinal axis of the slot is arranged in angular relationship to the longitudinal axis of the blade, the angularity of the slot being such that its edge walls resist tensioning forces applied longitudinally to the blade and tending to pull the blade from its socket in the handle or gripping frame of the saw.

A further object of the present invention is to provide one end of a saw blade with a notch arranged longitudinally of the blade and opening through an edge of the latter disposed in substantially perpendicular relation to the toothed edge of the blade, and wherein the said notch is adapted to receive the shank of a transverse fastening screw or other device employed in uniting the blade with an associated handle or hand grip.

For a further understanding of the invention, reference is to be had to the following description and the accompanying drawings, wherein.

Figure 1:
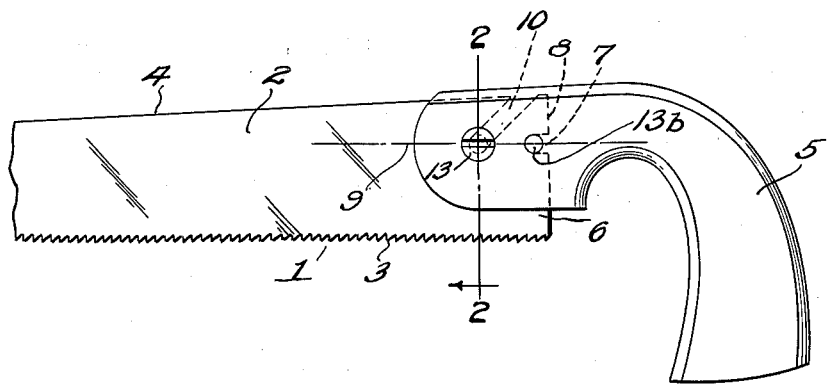
Fig. 1 is a view in side elevation of one end of a saw blade and an associated handle, the blade being shown as slotted in accordance with the present invention.
Figure 2:
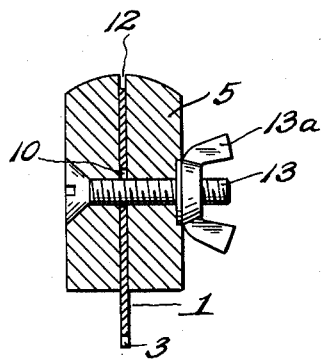
Fig. 2 is a detail transverse sectional view on the line 2—2 of Fig. 1.
Figure 3:
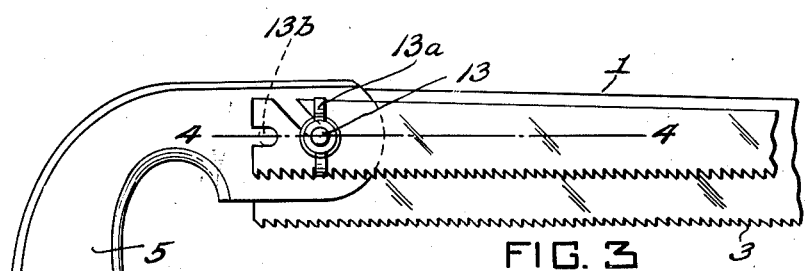
Fig. 3 is a view disclosing in side elevation representative forms of blades formed in accordance with the present invention and which may be used in connection with a common handle.
Figure 4:
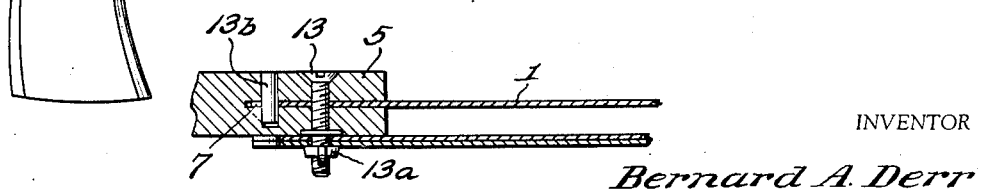
Fig. 4 is a transverse sectional view on the line 4—4 of Fig. 3.

With reference to the drawings, the improved saw blade shown at 1, comprises a body 2 having a toothed edge 3 and a plain back edge 4. The present invention resides primarily in the slot arrangement shown at one end of the blade wherein the slots are formed for the reception of the transverse fastening elements employed in uniting the blade with a handle or other equivalent gripping device or frame 5.

The body of the saw preferably tapers in width from the handle-receiving end 6 thereof to its front end. The end 6 of the blade, in this instance, includes an open-ended notch 7. This notch opens to the butt edge 8 of the blade which is disposed substantially perpendicular to the general plane of the toothed edge 3. Also, the longitudinal axis of the notch 7 is arranged in and in registry with the primary longitudinal axis 9 of the blade.

In addition to the notch 7, the blade includes an angularly disposed, elongated, open-ended slot 10 formed in the end 6 thereof. It will be noted that the longitudinal axis of the slot is disposed in acute angular relationship to that of the blade 1 and any perpendicular thereto. Advantageously, the axis of said slot may be disposed at an angle of approximately 45 degrees to the axis 9. The open end of the slot 10 is disposed in the back edge 4 of the saw blade.

In practice, the handle attaching butt end 6 of the blade is received in a slit 12 provided centrally in the forward part of the handle 5. A clamping device such as a customary saw screw or bolt 13 and a pin 13b pass transversely through aligned openings provided in the handle so that the shank of said screw and pin or other fastening devices will occupy the notch 7 and the slot 10. By tightening the fastening nut 13a in the usual manner, compressive forces are applied by the handle regions on opposite sides of the slit 12 to cause the same to grip frictionally the saw blade and hold the same in connection with the handle. By loosening the fastening nut slightly, the handle regions on opposite sides of the slit 12 separate sufficiently so that the blade may be pulled out of the same for repair or replacement purposes. However, if the fastening should but slightly loosen, the grip exercised by the handle on the blade end, owing to the angularity of the slot 10, tensioning forces on the blade or handle tending to separate these two parts will be resisted by an edge of the slot 10 engaging with the transverse shank of the fastening device 13. Thus accidental separation of the blade from the handle proper is prevented, but when deliberate removal of the blade is desired, the loosening of the nut 13a permits of manipulation of the blade so that the same may be removed from the handle without complete removal of the fastening devices.

The construction involves certain advantageous features, among which may be mentioned, first: through the slot and notch arrangement defined, the operating position of the blade with relation to the handle may be reversed, so that the toothed edge 3 of the blade may be positioned either upwardly or downwardly, the closed ends of both the notch 7 and the slot 10 being disposed in the longitudinal axis 9 of the blade; second, the construction provides for rapidity in changing or substituting one type of blade in the handle for another; and third, provides for positive fastening of the blade to the handle, so that the blade under normal conditions will not accidentally pull out of the handle. While the blade is particularly adapted for hand saws of many different types, I have used the same advantageously in the construction of saws of the keyhole, compass and hack varieties, the construction rendering itself readily to combinations or kits of saws adapted for various specific uses.

These blades are readily interchangeable with the handle and can be replaced or substituted for one another by merely loosening the wing nut 13a and thereafter partially turning the blade to free the shank of the bolt 13 from the angular slot and to remove the notch of the blade from the transverse pin 13b provided in the handle in spaced relation from the bolt.

The construction is susceptible to various mechanical changes without departing from the spirit and scope of the invention as the same have been defined in the following claim.

I claim:

A saw comprising a blade having a notch opening through one end edge, said blade also having a slot opening through one longitudinal edge thereof and adjacent said end, said slot having parallel uninterrupted side walls which extend at an acute angle to said edges, a handle provided with a slot to receive said blade, a pin extending across said handle slot to enter said blade notch and a fastening spaced from said pin and extending across said handle slot to enter said blade slot, and means coacting with said fastening to clamp the blade in the handle.

BERNARD A. DERR.

REFERENCES CITED

The following references are of record in the file of this patent:

UNITED STATES PATENTS

| Number | Name | Date |
|---|---|---|
| 298,115 | Peace | May 6, 1884 |
| 2,146,777 | Strong | Feb. 14, 1939 |